(12) United States Patent
Namba (10) Patent No.: US 6,519,525 B2
(45) Date of Patent: Feb. 11, 2003

(54) METHOD AND SYSTEM FOR COMMUNICATING FACILITY INFORMATION AND DEVICES THEREFOR

(75) Inventor: Hideaki Namba, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/885,592

(22) Filed: Jun. 19, 2001

(65) Prior Publication Data

US 2002/0013656 A1 Jan. 31, 2002

(30) Foreign Application Priority Data

Jul. 26, 2000 (JP) ........................................ 2000-225582

(51) Int. Cl.[7] .............................................. G01C 21/26
(52) U.S. Cl. ......................... 701/200; 701/25; 701/35; 701/209; 701/214; 340/988; 340/993
(58) Field of Search ............................. 701/200, 1, 25, 701/35, 201, 208, 209, 214; 340/988, 991, 992, 993

(56) References Cited

U.S. PATENT DOCUMENTS 6,006,160 A 12/1999 Tamaki et al.
6,073,075 A 6/2000 Kondou et al.

FOREIGN PATENT DOCUMENTS

JP A-10-505927 6/1998

*Primary Examiner*—Gertrude Arthur
(74) *Attorney, Agent, or Firm*—Harness, Dickey & Pierce, PLC

(57) ABSTRACT

A communication system comprises a mobile terminal and a server. The server 2 receives location data indicating a location in conjunction with a search request from the mobile terminal. The server defines one of a plurality of zones as a search zone based on the received location data, and searches for hotel vacancy data in the zone defined as the search zone. Searching by zone shortens the search time required to search for hotel vacancy data. A user of the mobile terminal can thus quickly obtain the desired hotel vacancy data.

26 Claims, 9 Drawing Sheets

| ZONE ID 01 MAP CODE NNNNNN01 | ZONE ID 02 MAP CODE NNNNNN02 | ZONE ID 03 MAP CODE NNNNNN03 | ZONE ID 04 MAP CODE NNNNNN04 | ZONE ID 05 MAP CODE NNNNNN05 |
|---|---|---|---|---|
| ZONE ID 06 MAP CODE NNNNNN06 | ZONE ID 07 MAP CODE NNNNNN07 | ZONE ID 08 MAP CODE NNNNNN08 | ZONE ID 09 MAP CODE NNNNNN09 | ZONE ID 10 MAP CODE NNNNNN10 |
| ZONE ID 11 MAP CODE NNNNNN11 | ZONE ID 12 MAP CODE NNNNNN12 | ZONE ID 13 MAP CODE NNNNNN13 | ZONE ID 14 MAP CODE NNNNNN14 | ZONE ID 15 MAP CODE NNNNNN15 |
| ZONE ID 16 MAP CODE NNNNNN16 | ZONE ID 17 MAP CODE NNNNNN17 | ZONE ID 18 MAP CODE NNNNNN18 | ZONE ID 19 MAP CODE NNNNNN19 | ZONE ID 20 MAP CODE NNNNNN20 |

FIG. 5

| ZONE ID | MAP CODE | HOTEL | UPDATE | FLAG | FEATURE |
|---|---|---|---|---|---|
| 01 | NNNNNN01 | A<br>B<br>C | 03/28 15:30<br>03/28 12:40<br>03/28 14:20 | VACANT<br>VACANT<br>FULL | |
| 02 | NNNNNN02 | D<br>E | 03/27 20:10<br>03/28 13:50 | VACANT<br>FULL | |
| 03 | NNNNNN03 | F<br>G | 03/28 15:40<br>03/28 15:10 | FULL<br>VACANT | |
| 04 | NNNNNN04 | H | 03/28 12:20 | VACANT | |
| 05 | NNNNNN05 | I | 03/27 18:10 | FULL | |
| 06 | NNNNNN06 | — | — | — | |
| 07 | NNNNNN07 | J<br>L | 03/28 16:40<br>03/28 16:20 | VACANT<br>FULL | |
| 08 | NNNNNN08 | K | 03/27 10:10 | FULL | |
| 09 | NNNNNN09 | — | — | — | |
| 10 | NNNNNN10 | — | — | — | |
| 11 | NNNNNN11 | Q | 03/27 13:40 | VACANT | |
| ⋮ | ⋮ | ⋮ | ⋮ | ⋮ | ⋮ |

FIG. 6

| ZONE ID | MAP CODE | ADVERTISEMENT |
|---|---|---|
| 01 | NNNNNN01 | BOOK STORE<br>MOVIE THEATER |
| 02 | NNNNNN02 | RESTAURANT |
| 03 | NNNNNN03 | TICKET CENTER |
| 04 | NNNNNN04 | CONVENIENCE SHOP<br>DRINK SHOP |
| 05 | NNNNNN05 | DEPARTMENT STORE<br>CHINESE RESTAURANT<br>GAS STATION |
| 06 | NNNNNN06 | PC SHOP |
| 07 | NNNNNN07 | TAILOR |
| 08 | NNNNNN08 | FLORIST<br>MUSIC BOX |
| 09 | NNNNNN09 | BAKERY |
| 10 | NNNNNN10 | RESTAURANT<br>BOOK STORE |
| 11 | NNNNNN11 | HAMBURGER SHOP |
| ⋮ | ⋮ | ⋮ |

METHOD AND SYSTEM FOR COMMUNICATING FACILITY INFORMATION AND DEVICES THEREFOR

CROSS REFERENCE TO RELATED APPLICATION

This application is based on and incorporates herein by reference Japanese Patent Application No. 2000-225582 filed Jul. 26, 2000.

BACKGROUND OF THE INVENTION

The present invention relates to a communication method and a communication system for communicating facility information relating to such facilities as lodging facilities and parking facilities between a server and mobile terminal, and a server and mobile terminal used in the communication system.

JP-10-505927 teaches a method, which enables a user to obtain facility information relating to facilities such as lodging facilities and parking facilities. A user riding in an automobile can obtain location information indicating the location of a parking lot using a traffic message channel (TMC) of a radio data system (RDS) accessible via a car radio. Parking lot location information is transmitted using an open block of the traffic message channel. The traffic message channel is transmitted sequentially. This means that the user needs to wait a relatively long time until the desired information can be obtained.

Over the last few years the Internet has made it possible to conduct real-time searches for the same types of information regarding lodging facilities and parking facilities. It is also possible to access the Internet and conduct searches from a car even while the car is moving. However, in order to find a lodging or parking facility that can be reached quickly, the location must be used as one of the search conditions and the user must therefore first confirm the current location.

While the user can readily specify the current location when in familiar area, the user needs to confirm the current location when in unfamiliar area. This necessarily increases the time needed to obtain facility information for the desired lodging, no parking, or other facilities.

SUMMARY OF THE INVENTION

It is therefore an object of the present invention to provide a communication method and communication system enabling a user to quickly obtain facility information relating to a desired lodging facility, parking; facility, or other type of facilities.

It is a further object of the present invention to provide a server and mobile terminal used for the above communication method and communication system.

According to the present invention, a communication system comprises a mobile terminal and a server for communicating facility information between the mobile terminal and the server. The mobile terminal sends a zone code in conjunction with a search request instruction requesting a facility information search. The zone code corresponds to location data indicating a location of the mobile terminal. Upon reception of the search request instruction, the server determines at least of one of a plurality of zones as a search zone based on the zone code received from the mobile terminal and searches for facility information in the server according to a zone defined as the search zone. The facility information is stored in the server in correspondence with the zones. The server sends the facility information obtained by the searching step to the mobile terminal. The mobile terminal displays the facility information received from the server.

Preferably, the server also sends advertising data for an advertisement along with the facility information. The mobile terminal also sends a reservation request for requesting a reservation to use the facility to the server, and the server accomplishes a process for reserving use of the corresponding facility based on the reservation request. The server also sends a proxy payment processing request requesting payment by proxy of a usage fee required for using the facility, and the server accomplishes a proxy payment process for paying by proxy the usage fee required for using the facility.

BRIEF DESCRIPTION OF THE DRAWINGS

These and other objects, features and advantages of the present invention will be readily understood from the following detailed description taken in conjunction with preferred embodiments described with reference to the accompanying drawings, in which like parts are designated by like reference numerals. In the drawings.

DETAILED DESCRIPTION OF THE PREFERRED EMBODIMENT

A preferred embodiment of the present invention is described below. It should be noted that the facility referenced by the facility information in the following embodiment is a lodging facility such as a hotel. In addition, a map code which is a registered trademark of DENSO CORPORATION (of Japan) for an encoded six to ten digit expression (encoded eight digit expression in this preferred embodiment) is used as the location data.

Figure 1:
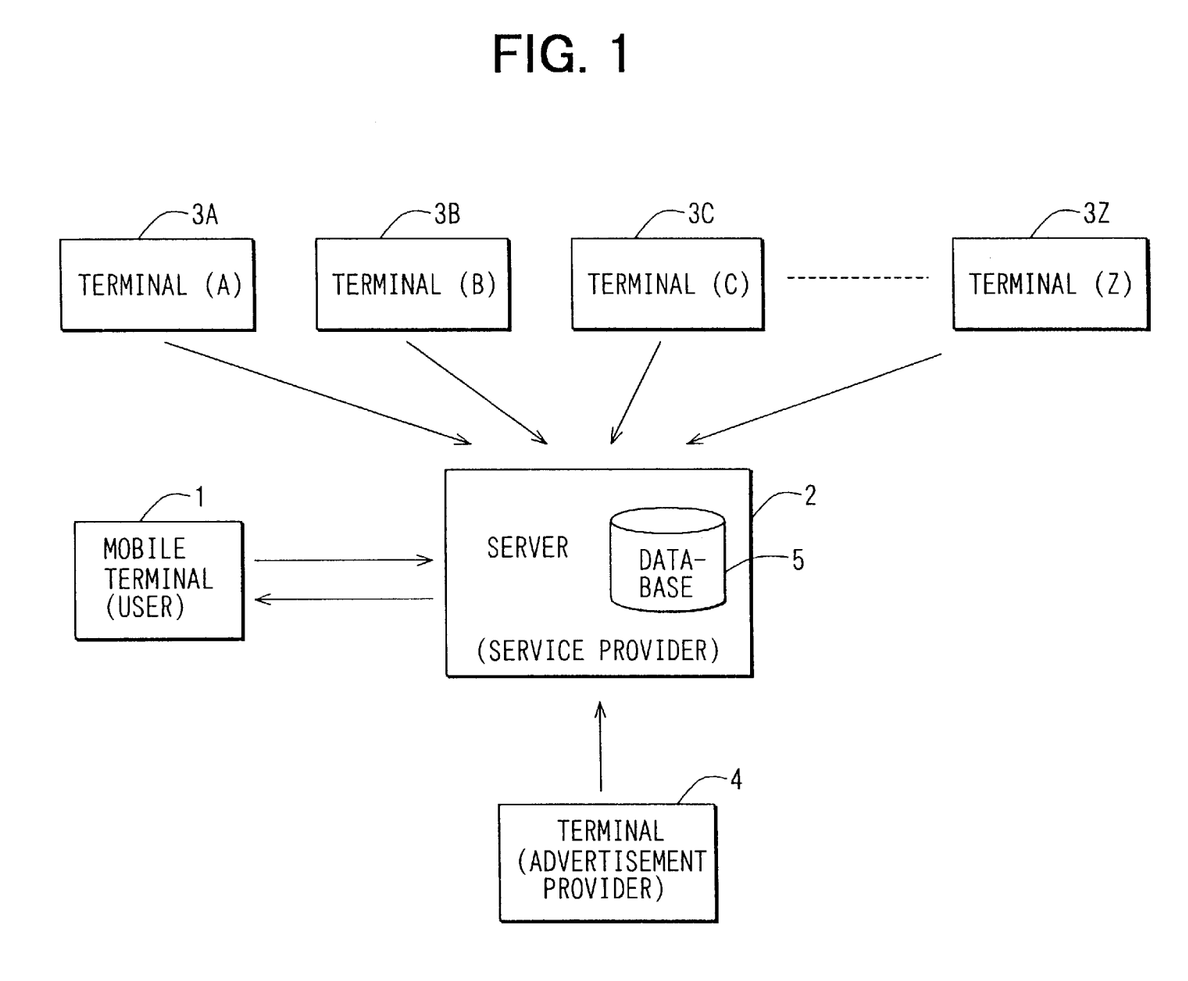
FIG. 1 is a schematic diagram showing a communication system according to the present invention.

FIG. 1 is a schematic diagram showing a communication system. A mobile terminal 1 is preferably a personal digital assistant (PDA) device. A server 2, which is managed and maintained by a service provider, gathers facility information and advertising data, and stores facility information and advertising data in its database 5. The facility information in this embodiment is room vacancy data obtained from terminals 3A to 3Z in hotels A to Z indicating the number of vacant rooms in each hotel. The advertising data is obtained from a terminal 4 operated by an advertisement provider (such as an advertising company).

In this preferred embodiment the mobile terminal 1 communicates with the server 2 via a public telecommunications line or the telecommunications line provided by a mobile service provider. In addition, terminals 3A to 3Z communicate with the server 2 via a public telecommunications line, and terminal 4 communicates with the server 2 via a public telecommunications line.

Figure 2:
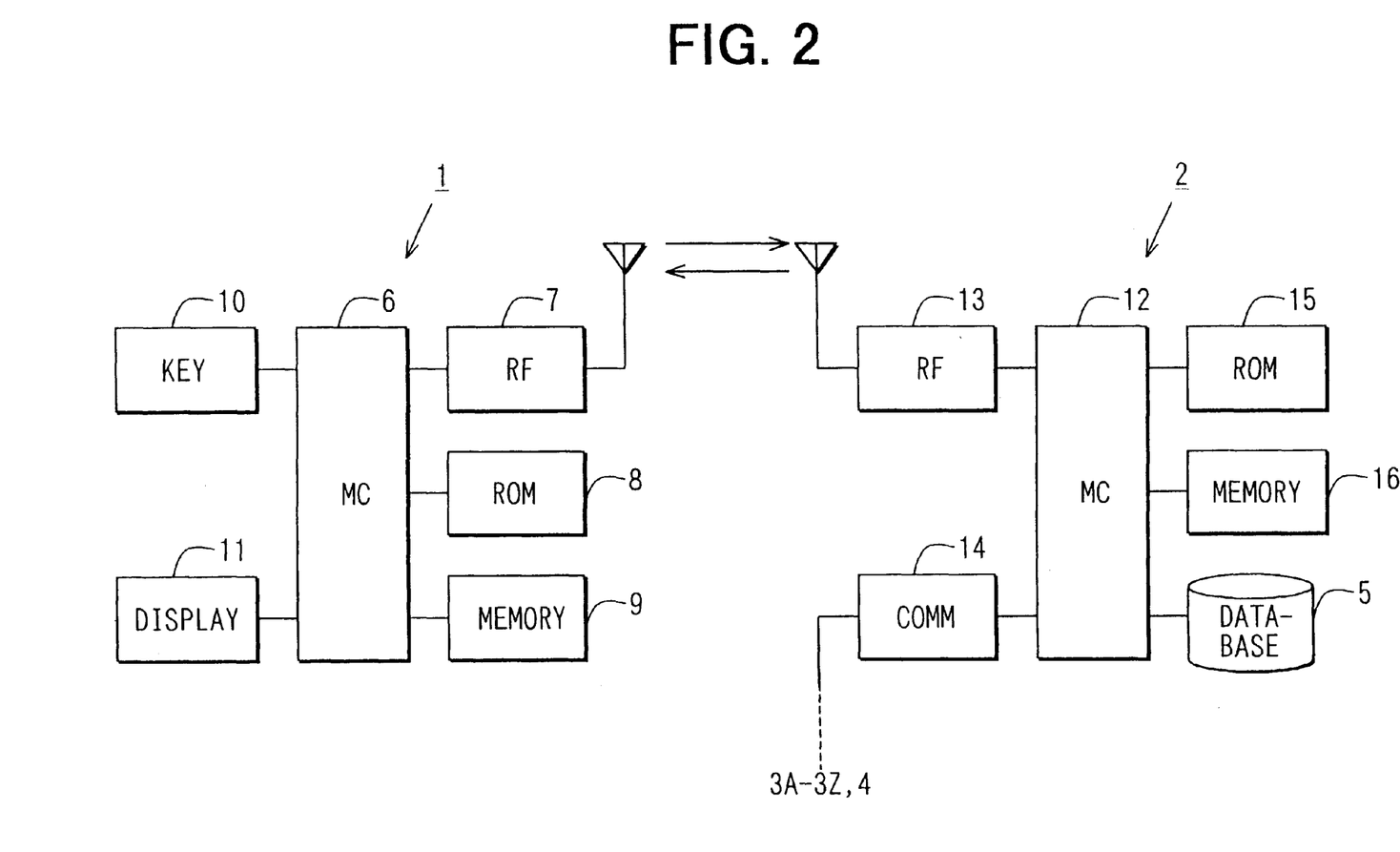
FIG. 2 is a function block diagram showing a mobile terminal and server used: in the communication.

FIG. 2 is a function block diagram showing the typical configuration of the mobile terminal 1 and server 2 shown in FIG. 1. The mobile terminal 1 has a control circuit 6, which is typically a microprocessor circuit (MC), a radio frequency (RF) circuit 7, ROM 8, memory 9, keyboard 10 and display 11. The control circuit 6 executes a control program stored in ROM 8 to control the overall operation of mobile terminal 1.

The server 2 has a control circuit 12, which is typically a microprocessor circuit (MC), a radio frequency (RF) circuit 13, communication circuit 14, ROM 15, and memory 16. The control circuit 12 executes a control program stored in ROM 15 to control the overall operation of server 2.

Figure 3:
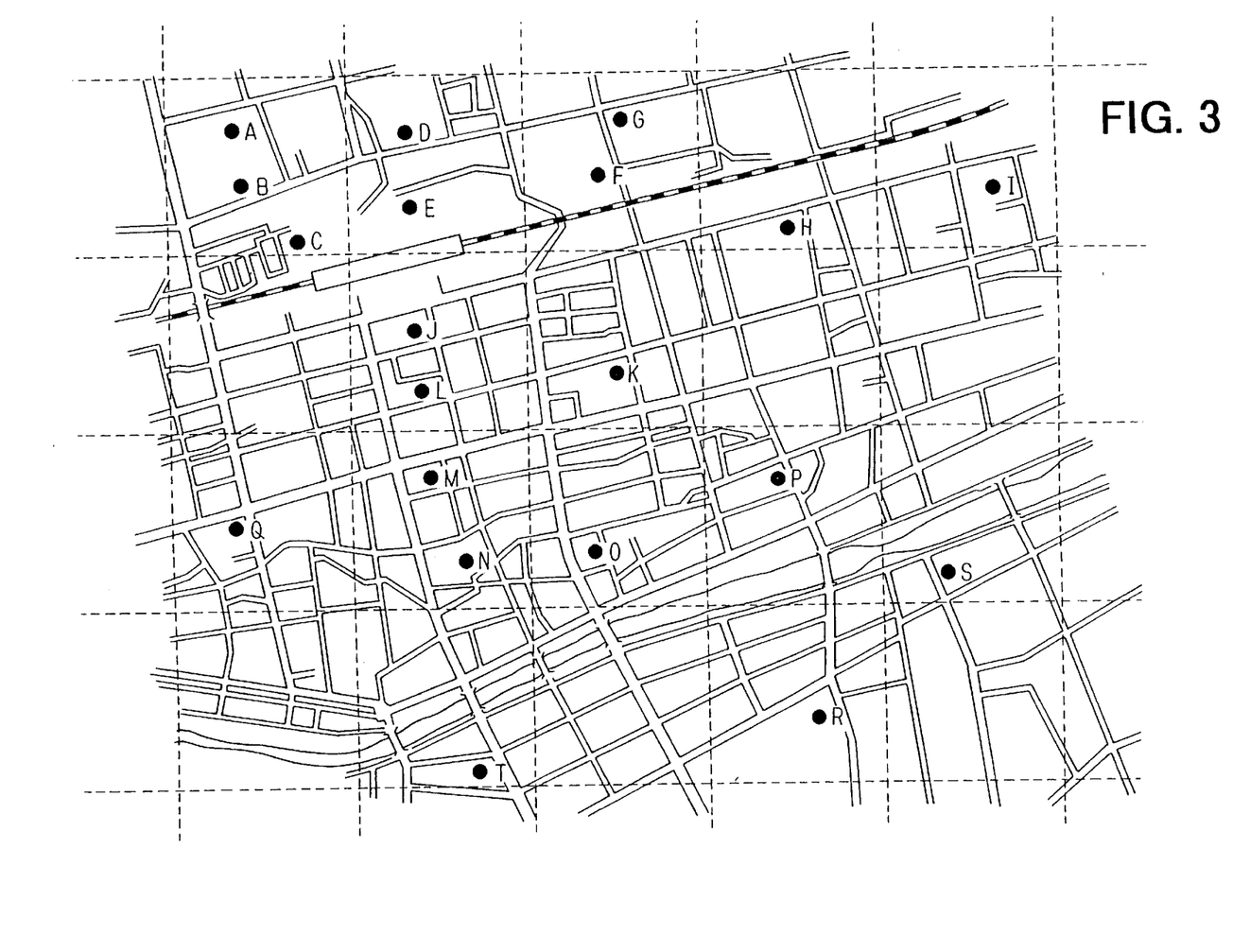
FIG. 3 is a map showing the location of each hotel.
Figure 4:
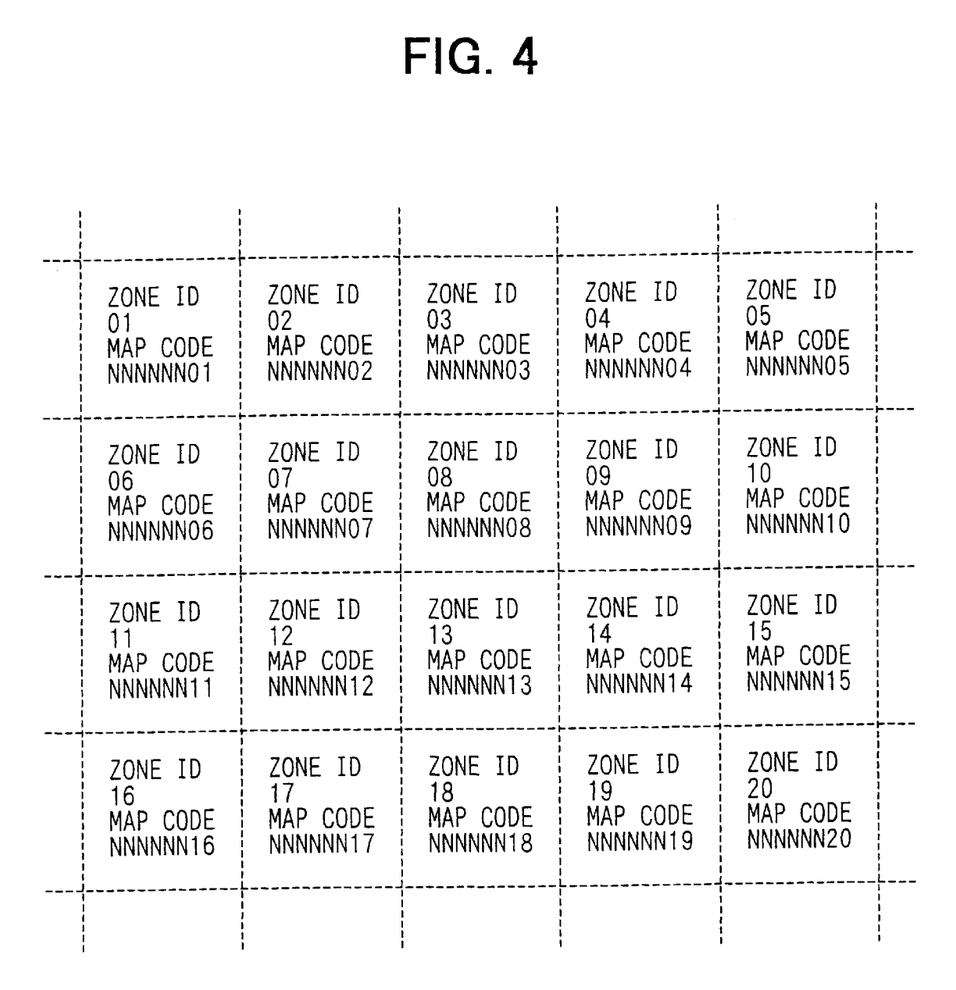
FIG. 4 is a table showing zone IDs and map codes.

The vacancy data and advertising data stored in database 5 are described next with reference to FIG. 3 to FIG. 6. It will be noted that hotels A to Z are located at specific positions on the map as shown in FIG. 3 such that the location of each hotel can be determined using zone ID and map code values such as shown in FIG. 4. For example, hotel A, hotel B and hotel C are located in the zone indicated by zone ID "01" and map code NNNNNN01 (where N is a single digit integer value), hotel D and hotel E are located in the zone indicated by zone ID "02" and map code NNNNNN02, and hotels F and G are located in the zone indicated by zone ID "03" and map code NNNNNN03.

It will be noted that hotels H to Z are likewise located in the zone indicated by a particular zone ID and map code as described above. There is a 1:1 correlation between zone IDs and map codes. The first two digits of the map code indicate an "area," the next three digits indicate a "block," and the next three digits indicate a "unit."

Figure 5:
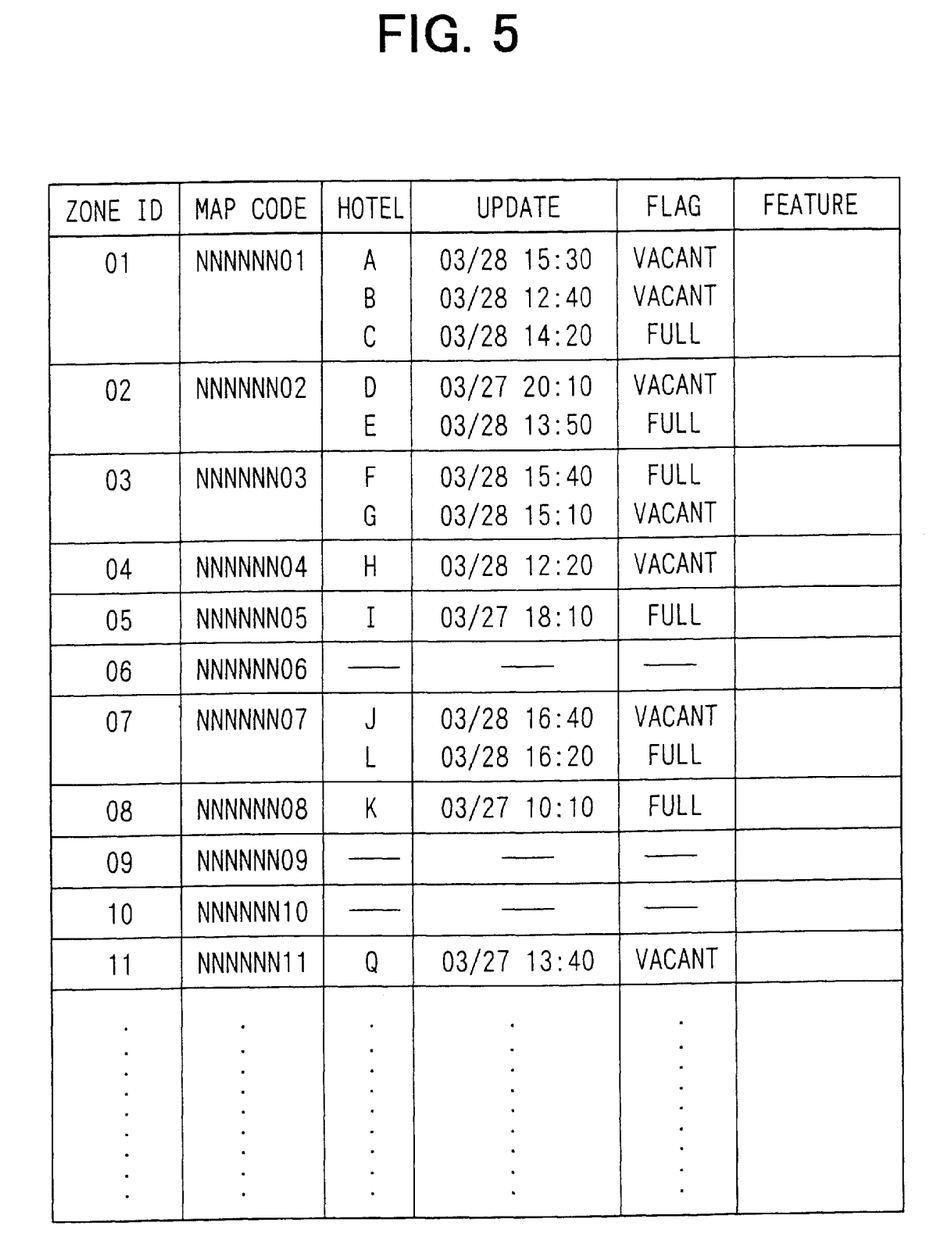
FIG. 5 is a table showing the organization of stored vacancy data.

As indicated by.the table shown in FIG. 5, database 5 stores zone ID, map code, hotel name, the date and time of the last update, a vacancy/full flag and special features organized by zone ID. More specifically, the database 5 stores the update time, vacancy/full flag and features for hotel A, hotel B and hotel C in the storage area for zone ID 01; stores the update time, vacancy/full flag and features for hotel D and hotel E in the storage area for zone ID 02; and stores the update time, vacancy/full flag and features for hotels F and G in the storage area for zone ID 03. Update time, vacancy/full flag and feature data are similarly stored in the storage areas for zone IDS 04 and higher, and further description thereof is omitted below.

Figure 6:
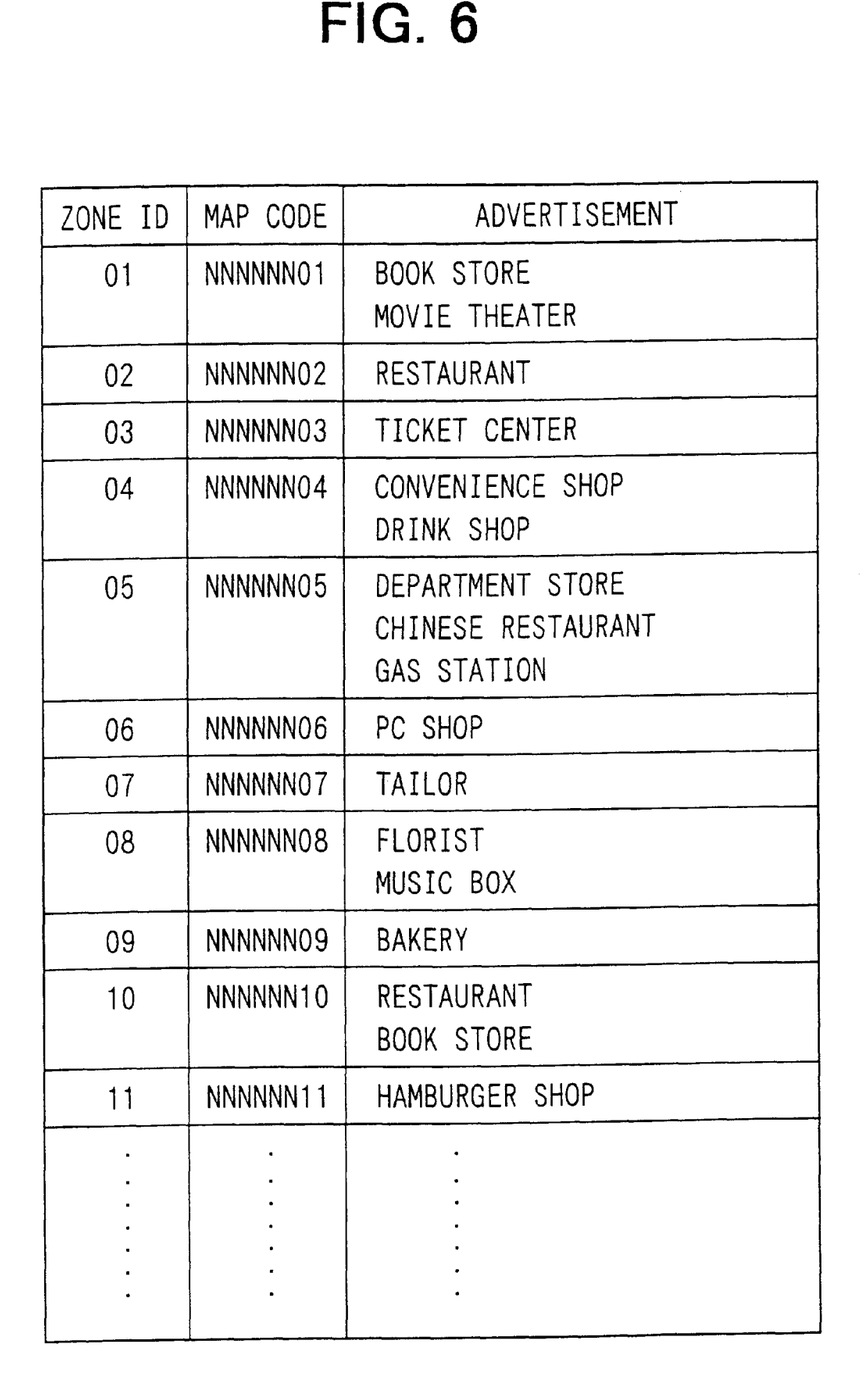
FIG. 6 is a table showing the organization of stored advertising data.

The database 5 also stores zone ID, map code and plural advertising data items organized by zone ID as shown in FIG. 6. For example, if it is assumed that there is a book store and movie theater in the zone identified by zone ID 01, then advertising data (such as information about new publications and new movies) relating to the book store and movie theater are stored in the storage area for zone ID 01. Similarly, if a restaurant is located in the zone identified by zone ID 02, then advertising data (such as menu specials) relating to the restaurant is stored in the storage area for zone ID 02. Similarly, if a ticket center is located in the zone identified by zone ID 03, then advertising data (such as information about upcoming concerts) relating to the ticket center is stored in the storage area for zone ID 03. Data is similarly stored to the storage areas for zone IDs 04 and higher, and further description thereof is omitted below.

Operation of the system is described next with reference to FIG. 7 to FIG. 12. The control circuit 7 of the server 2 is programmed to execute the processes of FIG. 7, FIG. 11 and FIG. 12.

Figure 7:
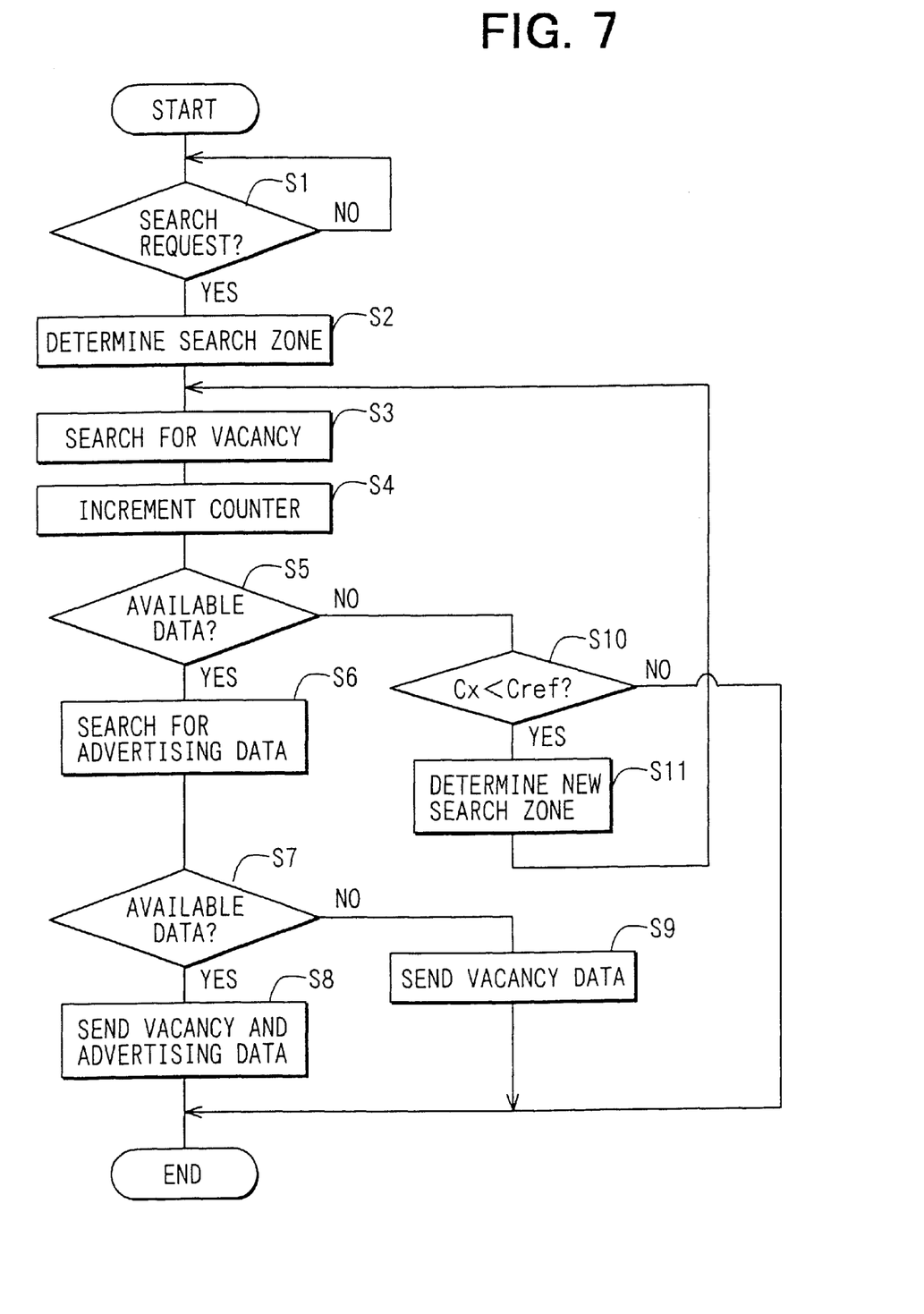
FIG. 7 is a flowchart showing a control process executed by the server shown in FIG. 2.

When the hotel search key on the mobile terminal 1 is operated, control circuit 6 detects that a key indicating map code input has been operated and controls the RF circuit 7 to send a search request and map code (location data) to server 2.

When the control circuit 12 of server 2 detects receipt of a search request and map code from mobile terminal 1 (YES at step S1), it determines which of the plural zones to search in by detecting the received map code and zone ID and setting the received zone ID as the search zone (step S2). More specifically, if the map code received from the mobile terminal 1 is NNNNNN02, control circuit 12 determines the zone of zone ID 02, which is identified by map code NNNNNN02, to be the search zone.

The control circuit 12 then searches the database 5 for vacancy data in the zone identified as the search zone (step S3), increments a counter indicating the number of searches (step S4), and checks whether vacancy data was found by the search (step S5). More specifically, if control circuit 12 determines the zone identified by zone ID 02 is the search zone, it finds vacancy data for hotel D and hotel E because vacancy data from hotel D and hotel E are stored in the storage area for zone ID 02.

If vacancy data for any hotel in the searched zone is obtained (YES at step S5), control circuit 12 next searches the database 5 for advertising data for the same search zone (step S6), and checks whether advertising data was found as a result of the search (step S7). More specifically, because the zone identified by zone ID 02 is the search zone in this case and advertising data for a restaurant in the search zone is stored in the storage area for zone ID 02, control circuit 12 obtains advertising data for the restaurant. The control circuit 12 then controls RF circuit 13 to send the vacancy data and advertising data obtained from the database 5 to mobile terminal 1 (step S8).

Figure 8:
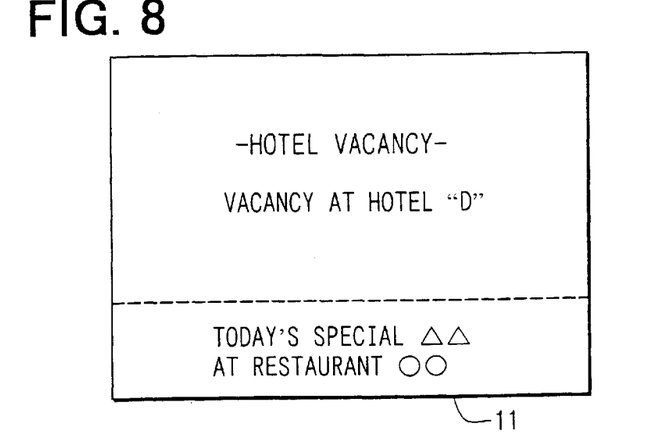
FIG. 8 is a diagram showing an exemplary output display of the mobile terminal.

When control circuit 6 of mobile terminal 1 detects receipt of vacancy data and advertising data from server 2, it provides the received vacancy data and advertising data on display 11 as shown in FIG. 8. More specifically, in this example control circuit 6 provides a vacancy data message indicating there is a vacancy at hotel D, and provides advertising data indicating today's special ΔΔ at restaurant ○○, on display 11.

As described above, it is thus possible for a user to input a map code to the mobile terminal 1 and thereby obtain vacancy data for hotels located in, a zone corresponding to input map code. The user of the mobile terminal 1 can thus input a map code indicating the current location to obtain vacancy data for hotels that can be reached quickly from the current location, and can input the map code indicating a destination to receive vacancy data for hotels that can be reached quickly from the destination.

Figure 9:
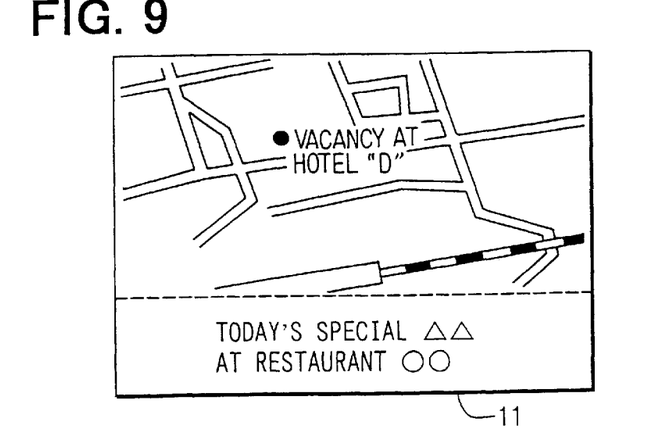
FIG. 9 is a diagram showing an another exemplary output display of the mobile terminal.

The user of mobile terminal 1 can also obtain advertising data for a restaurant, for example, located in the zone corresponding to the input map code, and thereby obtain recommended menu items, specials, and other restaurant information. It will also be obvious that the display is not limited to text, and graphics can also be displayed as shown in FIG. 9.

Figure 10:
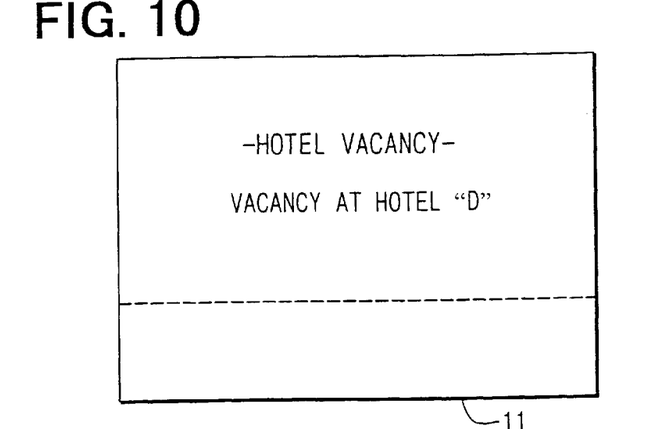
FIG. 10 is a diagram showing a further exemplary output display of the mobile terminal.

It should be noted that if control circuit 12 of server 2 does not find any advertising data for the zone used as the search zone (NO at step S7), control circuit 12 sends only the vacancy data to mobile terminal 1 (step S9). If control circuit 6 of mobile terminal 1 detects that only vacancy data is received from the server 2, it provides only the received vacancy data on display 11 as shown in FIG. 10 and does not provide any advertising data.

If the control circuit 12 of server 2 does not find any vacancy data in the zone determined as the search zone (NO at step S5), it compares the count value Cx with a specified reference Cref (step S10). If the count value Cx is less than the specified reference Cref (YES at step S10), control circuit 12 sets a zone adjacent to the previously determined search zone as the new search zone (step S11), and control then loops back to repeat the search from step S3.

More specifically, if the map code received from mobile terminal 1 is NNNNNN09, vacancy data will not be found because no vacancy data is stored in the storage area for zone ID 09 corresponding to map code NNNNNN09. The control circuit 12 therefore resets the search zone to the zone ID of the eight zones adjacent to zone 09 on the north, south, east and west sides, that is, to the zone of zone ID 03, the zone of zone ID 04, the zone of zone ID 05, the zone of zone ID 08, the zone of zone ID 10, the zone of zone ID 13, the zone of zone ID 14 and the zone of zone ID 15. It repeats the process described above. It is noted that the number of adjacent zones in which the search is run can be set to a defined constant number, or to a number defined by the user.

A mobile terminal user can thus obtain vacancy data for hotels located in a zone adjacent to the zone indicated by the input map code when there is no hotel in the zone indicated by the input map code and vacancy data therefor can thus not be obtained. It will also be obvious that it is not necessary to designate each zone adjacent in every direction (north, south, east and west) to the input zone as a new search zone. For example, searching could be limited to zones in a specific direction, such as east (including northeast and southeast) so that only three zones, that is, the zone of zone ID 05, the zone of zone ID 10, and the zone of zone ID 15 in this case, are set as the new search zones. It is also possible by specifying a search area to designate plural zones around a zone indicated as the search zone as the new search zones rather than searching only zones adjacent to the zone indicated as the search zone.

The control circuit 12 of server 2 also chronologically manages map codes received from mobile terminal 1 indicating the current location based on the time when the map codes are received. This enables the control.circuit 12 to analyze the correlation between the map code indicating the current location most recently received from mobile terminal 1 with map codes indicating the current location previously received from the mobile terminal 1, and thereby determine the direction in which mobile terminal 1 is moving. It is then possible to designate the search zones based on the identified direction of travel.

When control circuit 12 of server 2 receives an update request for updating the vacancy data from one of the terminals 3A to 3Z of hotels A to Z, control circuit 12 updates the vacancy data stored in database 5. Control circuit 12 likewise updates the advertising data stored in database 5 when an update request for updating the advertising data is received from the advertising company terminal 4. It will also be obvious in this case that terminals 3A to 3C of hotels A to Z could send an update request each time there is a change in the vacancy data, or at regular time intervals.

The server 2 is also configured to execute a reservation process enabling the user to reserve a room at a hotel when a reservation request indicating a hotel reservation is received from mobile terminal 1. This process is described next with reference to FIG. 11.

Figure 11:
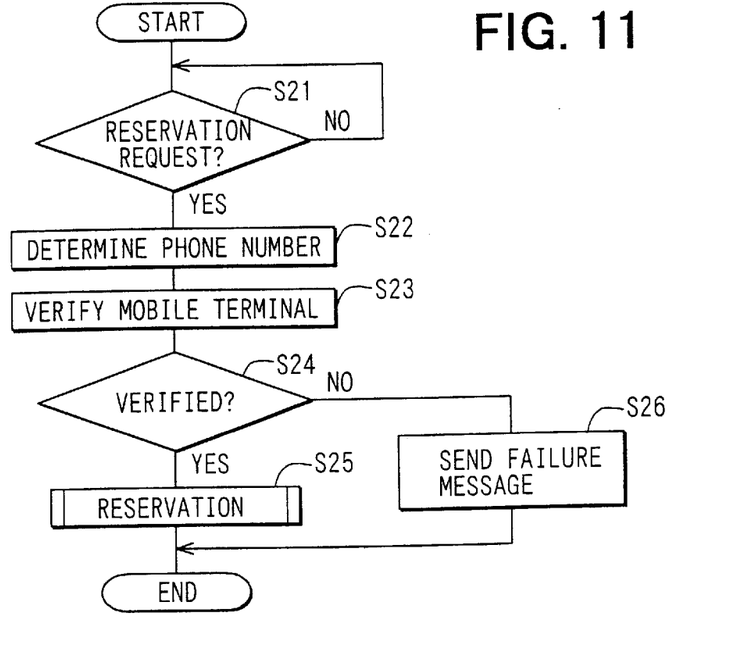
FIG. 11 is a flow chart showing a reservation request handling process executed by the server shown in FIG. 2.

When control circuit 6 of mobile terminal 1 detects that the reservation request key on the mobile terminal 1 has been operated, it controls the RF circuit 7 to send a reservation request to server 2.

When the control circuit 12 of server 2 detects receipt of a reservation request from mobile terminal 1 (YES at step S21), it determines the telephone number of the mobile terminal 1 (step S22) and then verifies whether the mobile terminal 1 is a valid terminal (step S23). If verified, that is, authentication is successful (YES at step S24), control circuit 12 executes the process for reserving the hotel based on the received reservation request (step S25). If verification fails (NO at step S24), control circuit 12 controls RF circuit 13 to send an verification failure message to the mobile terminal 1 (step S26).

If server 2 then receives a proxy payment request from mobile terminal 1 indicating a request to process payment by proxy for using the hotel, it runs a proxy payment processing operation to pay the hotel charge. This operation is described next below with reference to the flow chart in FIG. 12.

Figure 12:
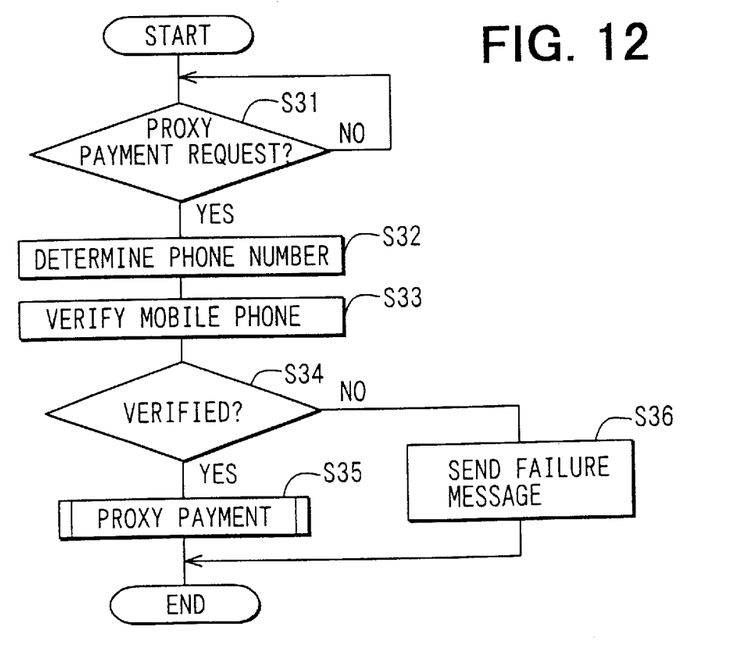
FIG. 12 is a flow chart showing a proxy payment request handling process executed by the server shown in FIG. 2.

When control circuit 6 of mobile terminal 1 detects that the payment key on the mobile terminal 1 for paying the hotel charge has been operated, it controls the RF circuit 7 to send a proxy payment processing request to server 2.

When the control circuit 12 of server 2 detects that a proxy payment processing request is received from mobile terminal 1 (YES at step S31), it determines the telephone number of the mobile terminal 1 (step S32) and then verifies whether the mobile terminal 1 is a valid terminal (step S33). If verified, that is, authentication is successful (YES at step S34), control circuit 12 executes the process for processing proxy payment of the hotel charge based on the proxy payment processing request (step S35). If verification fails (NO at step S34), control circuit 12 controls RF circuit 13 to send a verification failure message to the mobile terminal 1 (step S36).

As described above, when the server 2 in the communication system receives a search request from the mobile terminal 1 in conjunction with a map code indicating a location, it determines from the received map code which of plural map zones to use as the search zone, then searches in the identified search zone for hotel vacancy data. Because the system searches by zone, it can shorten the search time required to search for hotel vacancy data, and the mobile terminal user can quickly obtain the desired hotel vacancy data.

Therefore, by sending a map code indicating the current location, for example, mobile terminal users can quickly obtain vacancy data for hotels that can be reached quickly from the current location. In addition, by sending a map code indicating the destination location, the user can quickly obtain vacancy data for hotels that can be reached quickly from the destination location.

Furthermore, even if the server 2 cannot find vacancy data for hotels based on the zone first designated as the search zone, it can determine a new search zone adjacent to the first defined search zone and then search for hotel vacancy data in the zone defined as the new search zone. Therefore, if hotel vacancy data can then be found in the zone defined as the new search zone, the mobile terminal user can still quickly obtain the desired hotel vacancy data.

Furthermore, by.managing location data indicating the received current location in chronological order, the server 2 can determine the direction of travel of the mobile terminal 1 when location data indicating the current position of the mobile terminal 1 is received. The server 2 then defines as the search zone one or a plurality of zones based on the determined direction of movement of the mobile terminal 1. As a result, if the mobile terminal user intermittently inputs location data indicating the current position, it is possible to quickly obtain vacancy data for hotels that can be reached quickly from the current position in the direction of movement predicted from the plural location data indicating the current location.

Yet further, because the server 2 is configured to store hotel vacancy data organized by zone, it is possible to quickly search the desired hotel vacancy data from the database 5, and the time required to search for hotel vacancy data can be yet further shortened.

In addition, because the server 2 is configured to update hotel vacancy data when an update request is received from any terminal 3A to 3Z of hotels A to Z, the server 2 can store the most recent vacancy data. As a result, the mobile terminal user can also obtain the most recent vacancy data.

The server 2 is configured to send advertising data to the mobile terminal 1. When it receives advertising data from server 2, the mobile terminal 1 then presents the received advertising data on display 11. The server 2 is thus configured to provide the service of adding advertising data to the desired vacancy data. The manager and operator of the server 2 can thus use the advertising fees received from advertising data providers (the parties providing the advertising data to be supplied with the vacancy data) as capital to finance the service of providing hotel vacancy data to the mobile terminal 1, and thus reduce the fee charged to the user of the mobile terminal 1 by an amount determined by the collected advertising fees. The mobile terminal user can thus obtain hotel vacancy data for a relatively low fee, and thereby also receive economic benefit.

The server 2 is configured to send to the mobile terminal 1 advertising data relating to the hotel vacancy data obtained by the search. The mobile terminal user can thus obtain useful advertising data (such as menu information for restaurants near the hotel) because the advertising data is relevant to the hotel selected for use.

The advertising data is stored organized by zone. The server 2 can thus quickly search the database 5 for advertising data, and the search time required to search for advertising data can be shortened.

When the mobile terminal 1 sends to the server 2 a reservation request requesting a reservation at a hotel, the server 2 executes a process for making a hotel reservation based on the received reservation request when the request is received from the mobile terminal 1. The mobile terminal user can thus easily make a hotel reservation without going through the trouble of directly contacting the operator of the hotel for a room reservation.

Yet further, when the mobile terminal 1 sends a proxy payment processing request to the server 2 requesting the server 2 to process proxy payment for the hotel charge and the server 2 then receives this proxy payment processing request, the server 2 executes a process for processing payment of the hotel charge by proxy according to the received proxy payment processing request. It is therefore not necessary for the mobile terminal user to directly handle the task of paying the hotel operator for the charge required to use the hotel, and paying the hotel charge can thus be easily accomplished.

The present invention shall not be limited to the configurations described above, and can be varied or expanded as described below.

That is, the present invention can also be applied to a system providing facility information for a variety of facilities other than hotel and other lodging facilities, including parking facilities, entertainment facilities such as pachinko halls and karaoke centers, dining facilities such as restaurants, and gas stations and other fueling facilities.

Furthermore, location data shall not be limited to using map codes. For example, the mobile terminal could be provided with a GPS (global positioning system) receiver enabling the GPS data obtained from a GPS satellite to be processed and expressed as latitude, longitude, and altitude data. Location data could also be expressed with information indicating a political or administrative jurisdiction such as city, town, village, or ward.

The zone ID and map code shall also not be limited to a 1:1 correlation, and a 1:n (where n is a natural number of 2 or greater) zone ID to map code correlation could be used such that plural map codes correspond to one zone ID.

The mobile terminal shall also not be limited to a PDA device and could be an on-board terminal of an automobile. In addition, map codes can also be input using the input section of a car navigation system by providing an appropriate interface function to the car navigation system, and the vacancy data and advertising data returned by the server can be displayed on the display of the car navigation system. A voice recognition function could also be provided so that the user could input map codes by speaking, and the vacancy data and advertising data could be similarly output audibly from speakers.

Yet further, the terminals used by the hotels and the terminals used by the advertisement providers can be connected to the server using a dedicated line.

There can also be plural advertisement providers, and content from plural advertisers could be continuously output to the mobile terminal.

While the map code referred to in the preceding embodiment consists of area, block, and unit code units, and facility information for facilities located in a zone indicated by this map code is described as stored in a table such as shown in FIG. 3, the invention shall not be so limited. It is alternatively possible, for example, to store information for facilities located in a map area indicated by the area and block code units of the above map code, that is, in the area indicated by the "unit" code part of the above map code. Information about facilities in this larger.area can then be obtained by sending a code containing the area and block code parts of the above-described map code.

It is also possible for the mobile terminal 1 to send a map code containing the above area, block, and unit code parts, and then search to obtain facility information for facilities in the area indicated by the area and block code parts of the map code.

It is also possible to store a database of map codes and facility information in the mobile terminal 1, and execute the search in the mobile terminal 1 to find information about facilities indicated by a specified map code. While this configuration will not provide the most recent, up-to-date information about facilities, facility information searches are faster and effective.

What is claimed is:

1. A method for communicating facility information between a server and a mobile terminal, the method comprising steps of:

receiving by the mobile terminal an input of a zone code from a user of the mobile terminal;

transmitting from the mobile terminal the zone code in conjunction with a search request instruction requesting a facility information search, the zone code corresponding to location data indicating a location of the mobile terminal;

determining by the server at least of one of a plurality of zones as a search zone based on the zone code received from the mobile terminal and searching for facility information in the server according to a zone defined as the search zone, the facility information being stored in the server in correspondence with the zones; and sending the facility information obtained by the searching step from the server to the mobile terminal so that the facility information received from the server is provided on the mobile terminal.

2. The method as in claim 1, wherein the determining step automatically changes the search zone when the facility information in a present search zone is not available in the server.

3. A communication system for communicating facility information comprising:

a mobile terminal including control means, receiving means, transmission means and output means, the control means being programmed to receive and send from the transmission means a zone code corresponding to location data indicating a location in conjunction with a search request instruction requesting a facility information search and to output from the output means facility information received by the receiving means, the zone code being input by a user of the mobile terminal; and a server including storage means for storing facility information in correlation with zones, control means, receiving means and transmission means, the control means being programmed to define at least one of a plurality of zones as a search zone based on the zone code received from the mobile terminal by the receiving means thereof, to search the storage means for facility information according to the zone defined as the search zone, and to send the facility information obtained by the search from the transmission means thereof to the mobile terminal.

4. The communication system as in claim 3, wherein: the control means of the server is programmed to define as a search zone a zone adjacent to the zone defined as the search zone.

5. The communication system as in claim 3, wherein: the control means of the server is programmed to determine a direction of movement of the mobile terminal, and to define as a search zone at least one zone of a plurality of zones based on a detected direction of movement of the mobile terminal by chronologically managing location data indicating a current position received by the receiving means of the server.

6. The communication system as in claims 3, wherein; the storage means of the server stores the facility information organized by zone.

7. The communication system as in claim 3, wherein: the control means of the server is programmed to update the facility information stored in the storage means when the receiving means of the server receives an update request from a facility.

8. The communication system as in claim 3, wherein: the storage means of the server stores advertising data for an advertisement; and the control means of the server is programmed to send advertising data to the mobile terminal from the transmission means of the server; and the control means of the mobile terminal is programmed to output from the output means of the mobile terminal advertising data received from the server by the receiving means of the mobile terminal.

9. The communication system as in claim 8, wherein:

the control means of the server is programmed to send from the transmission means of the server to the mobile terminal the advertising data relevant to the facility information obtained by searching.

10. The communication system as in claim 8, wherein:

the storage means of the server stores the advertising data organized by zone.

11. The communication system as in claim 3, wherein:

the control means of the mobile terminal is programmed to send a reservation request for requesting a reservation to use a facility from the transmission means of the mobile terminal to the server; and the control means of the server is programmed to accomplish a process for reserving use of the corresponding facility based on the reservation request received from the mobile terminal by the receiving means of the server.

12. A communication system as in claim 3, wherein:

the control means of the mobile terminal is programmed to send from the transmission means of the mobile terminal to the server a proxy payment processing request requesting payment by proxy of a usage fee required for using a facility; and the control means of the server is programmed to accomplish a proxy payment process for paying by proxy the usage fee required for using the facility based on the proxy payment processing request received from the mobile terminal by the receiving means of the server.

13. A server for communicating facility information with a mobile terminal which is configured to send to the server location data indicating a location in conjunction with a search request instruction requesting a search for facility information and output the facility information received from the server, the server comprising:

receiving means;

transmission means;

storage means for storing facility information for a zone; and control means for defining at least one of a plurality of zones as a search zone based on location data received from the mobile terminal by the receiving means, searching the storage means for facility information according to the zone defined as the search zone, and sending from the transmission means to the mobile terminal the facility information obtained by the search.

14. A mobile terminal for communicating facility information with a server which is configured to store facility information in correlation to a zone, define at least one of a plurality of zones as a search zone based on location data, search for facility information according to the zone defined as the search zone, and send the facility information obtained by the search, the mobile terminal comprising:

input means operable by a user for inputting location data indicating a location in the form of a zone;

transmission means;

receiving means;

output means; and control means for sending from the transmission means to the server the location data in conjunction with a search request requesting a facility information search, and outputting from the output means facility information received from the server by the receiving means.

15. A facility information search device comprising:

storage means for storing a plurality of facility information for facilities located in a plurality of zones defined as zone codes;

input means for receiving input specifying one of the zones;

search means for defining as a search zone the zone specified by the input means, and searching the facility information in the search zone; and output means for outputting facility information searched by the search means.

16. The facility information search device as in claim 15, further comprising:

receiving means for receiving data from an external terminal; and transmission means for sending data to the external terminal, wherein the input means receives input specifying a zone based on data received by the receiving means, and wherein the output means outputs the searched facility information to the external terminal by way of the transmission means.

17. A facility information search device comprising:

storage means for storing with a correlation therebetween a specific code combining a zone code and a block code and facility information for a facility located in a region identified by the specific code, the zone code indicating an area of a zone segmenting map data into a large grid, and the block code indicating the area of a block segmenting the area indicated by the zone code into a grid;

input means for receiving input specifying a specific code;

search means for defining as a search zone the area corresponding to the specific code indicated by the input means, and searching facility information in the zone; and output means for outputting the facility information searched by the search means.

18. A facility information search device comprising:

storage means for storing with a correlation therebetween a specific code combining a zone code and a block code and facility information for a facility located in a region identified by the specific code, the zone code indicating an area of a zone segmenting map data into a large grid, and the block code indicating the area of a block segmenting the zone code into a grid; and input means for receiving input specifying a specific code;

search means for identifying the zone code corresponding to the specific code indicated by the input means, defining the area indicated by this zone code as the search zone, and searching for facility information in the zone; and output means for outputting facility information searched by the search means.

19. A device as in claim 18, further comprising a control means, associated with said input means, and determining a direction of movement of said specified code, to define a search zone including at least one zone among the plurality of zones based on a detected direction of movement of the mobile terminal, write chronologically managing location data indicating a current position received by said control means.

20. A device as in claim 19, further comprising a mobile terminal whose position is monitored and includes a control means to send a reservation request requesting a reservation to use a specified facility, and further comprising a control means, associated with said storage means, for reserving use of the corresponding facility.

21. A device as in claim 19, further comprising a control means which is programmed to send a proxy payment from a mobile terminal to the server, and said proxy payment representing a usage for using a specified facility, and enabling said payment.

22. A device as in claim 18, wherein said storage means stores facility information organized by zones, and said search means searches said storage means for said facility information.

23. A device as in claim 18, further comprising a control means which updates said facility information in said storage means.

24. A device as in claim 18, wherein said storage means stores advertising data indicative of an advertisement, and further comprising a control means which sends said advertising data to a mobile terminal.

25. A device as in claim 24, wherein said control means is responsive to results of said search, and sends specific advertising data relevant to the facility information obtained by said search.

26. A device as in claim 24, wherein said storage means stores facility information organized by zones, and said search means searches said storage means for said facility information.

* * * * *